United States Patent
Oh et al.

(10) Patent No.: US 12,009,528 B2
(45) Date of Patent: Jun. 11, 2024

(54) CATALYST COMPLEX FOR FUEL CELL, METHOD OF MANUFACTURING THE CATALYST COMPLEX, ELECTROLYTE MEMBRANE INCLUDING THE CATALYST COMPLEX AND METHOD OF MANUFACTURING THE ELECTROLYTE MEMBRANE

(71) Applicants: Hyundai Motor Company, Seoul (KR); Kia Corporation, Seoul (KR)

(72) Inventors: Seung Jeong Oh, Gyeonggi-do (KR); Woong Pyo Hong, Gyeonggi-do (KR); Byoung Su Kim, Gyeonggi-do (KR); Min Kyung Kim, Gyeonggi-do (KR); Soon Hong Park, Gyeonggi-do (KR); Yong Min Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/992,120

(22) Filed: Nov. 22, 2022

(65) Prior Publication Data
US 2023/0084103 A1   Mar. 16, 2023

Related U.S. Application Data

(62) Division of application No. 16/837,549, filed on Apr. 1, 2020, now Pat. No. 11,545,673.

(30) Foreign Application Priority Data

Jul. 25, 2019 (KR) .................. 10-2019-0089993

(51) Int. Cl.
H01M 4/92   (2006.01)
H01M 4/88   (2006.01)
(Continued)

(52) U.S. Cl.
CPC ......... H01M 4/925 (2013.01); H01M 4/8892 (2013.01); H01M 8/1004 (2013.01);
(Continued)

(58) Field of Classification Search
CPC ..... H01M 2008/1095; H01M 2250/20; H01M 4/8892; H01M 4/925; H01M 8/1004;
(Continued)

(56) References Cited

U.S. PATENT DOCUMENTS

2007/0072036 A1   3/2007   Berta et al.
2008/0206616 A1   8/2008   Atanassova et al.
(Continued)

FOREIGN PATENT DOCUMENTS

KR   101877753 B1   7/2018

*Primary Examiner* — Victoria H Lynch
(74) *Attorney, Agent, or Firm* — Fox Rothschild LLP

(57) ABSTRACT

Disclosed are a catalyst complex and a method of manufacturing the same. The catalyst complex may be manufactured by uniformly depositing metal catalyst particles on pre-treated support particles through an atomic layer deposition process using a fluidized-bed reactor, which may be then uniformly dispersed throughout the ionomer solution. As such, manufacturing costs may be reduced due to the use of a small amount of metal catalyst particles and the durability of an electrolyte membrane and OCV may increase. Further disclosed are a method of manufacturing the catalyst complex, an electrolyte membrane including the catalyst complex, and a method of manufacturing the electrolyte membrane.

9 Claims, 3 Drawing Sheets

(51) Int. Cl.
  *H01M 8/1004* (2016.01)
  *H01M 8/102* (2016.01)
  *H01M 8/1081* (2016.01)

(52) U.S. Cl.
  CPC ......... *H01M 8/102* (2013.01); *H01M 8/1081* (2013.01); *H01M 2250/20* (2013.01)

(58) Field of Classification Search
  CPC .. H01M 8/1018; H01M 8/102; H01M 8/1051; H01M 8/1069; H01M 8/1081; Y02E 60/50; Y02P 70/50
  See application file for complete search history.

(56) References Cited

U.S. PATENT DOCUMENTS

| | | |
|---|---|---|
| 2012/0094210 A1 | 4/2012 | Uensal et al. |
| 2021/0159510 A1 | 5/2021 | Kim |

CATALYST COMPLEX FOR FUEL CELL, METHOD OF MANUFACTURING THE CATALYST COMPLEX, ELECTROLYTE MEMBRANE INCLUDING THE CATALYST COMPLEX AND METHOD OF MANUFACTURING THE ELECTROLYTE MEMBRANE

RELATED APPLICATION

This application is a Divisional Application from U.S. application Ser. No. 16/837,549, filed Apr. 1, 2020, which claims priority to Korean Patent Application No.: 10-2019-0089993, filed on Jul. 25, 2019. The disclosures of which are incorporated herein by reference in their entirety.

CROSS REFERENCE TO RELATED APPLICATION

The present application claims priority based on Korean Patent Application No. 10-2019-0089993, filed on Jul. 25, 2019, the entire content of which is incorporated herein for all purposes by this reference.

TECHNICAL FIELD

The present invention relates to a catalyst complex including metal catalyst particles, thereby decreasing manufacturing costs and increasing the durability of an electrolyte membrane, a method of manufacturing the catalyst complex, an electrolyte membrane including the catalyst complex and a method of manufacturing the electrolyte membrane.

BACKGROUND OF THE INVENTION

In polymer electrolyte membrane fuel cells, a polymer electrolyte membrane plays a role in transporting oxidized protons from the anode to the cathode and preventing hydrogen from coming into contact with oxygen. Furthermore, the polymer electrolyte membrane acts as an electrical insulator between the anode and the cathode.

If the polymer membrane does not completely block gas, OCV (Open Circuit Voltage) decreases and the durability of the electrolyte membrane is deteriorated. Hydrogen passed through the polymer membrane from the anode reacts with oxygen to thus generate water ($H_2O$), hydrogen peroxide ($H_2O_2$), etc. or is discharged without reaction.

During these reactions, OCV decreases by forming a mixed potential with the reduction reaction of oxygen, which is the original reaction of the cathode. Moreover, hydrogen passed through the electrolyte membrane reacts with oxygen to thus form hydrogen peroxide or oxygen radicals, and such hydrogen peroxide or radicals attack the polymer of the electrolyte membrane, thereby degrading the membrane and consequently generating pinholes. The pinholes thus generated cause gas permeability to further increase, such that the rate of generation of hydrogen peroxide and radicals is further accelerated and the rate of degradation of the electrolyte membrane ultimately increases.

SUMMARY OF THE INVENTION

In one preferred aspect, provided is a method of manufacturing a catalyst composition, in which metal catalyst particles may be uniformly deposited on a support through atomic layer deposition using a fluidized-bed reactor, thereby reducing manufacturing costs due to the use of a small amount of metal catalyst particles.

Further, in one preferred aspect, provided is an electrolyte membrane that may have improved durability due to the use of a small amount of metal catalyst particles.

Also, in one preferred aspect, provided is an electrolyte membrane, in which the generation of hydrogen peroxide or radicals may be suppressed, thus increasing the durability of the electrolyte membrane and OCV.

Additionally, in one preferred aspect, provided is a method of manufacturing an electrolyte membrane for a fuel cell, in which the catalyst complex may be dispersed throughout the ionomer solution, thereby improving the durability of the electrolyte membrane.

The aspects of the present invention are not limited to the foregoing, and will be able to be clearly understood through the following description and to be realized by the means described in the claims and combinations thereof.

In an aspect, provided is a catalyst complex for a fuel cell. The catalyst complex may include metal catalyst particles, and support particles having the metal catalyst particles attached to the surface thereof, in which the support particles may include an ionomer.

The metal catalyst particles may have a wide range of sizes including, for example, size of about 1 to 10 nm.

The support particles may include one or more selected from the group consisting of a fluorine-based polymer, a benzimidazole-based polymer, a polyimide-based polymer, a polyetherimide-based polymer, a polyphenylene-sulfide-based polymer, a polyether-ether-ketone-based polymer, and a polyphenyl-quinoxaline-based polymer.

The catalyst complex may include an amount of about 5 to 20 wt % of the metal catalyst particles based on the total weight of the catalyst complex.

In an aspect, provided is a method of manufacturing a catalyst composition for a fuel cell. The method may include preparing support particles containing a functional group, and manufacturing a catalyst complex by attaching metal catalyst particles to the support particles containing the functional group. Particularly, the support particles containing the functional group may include an ionomer.

Preferably, the support particles containing the functional group may include a hydroxyl functional group.

The support particles containing the functional group may be prepared by steps including: i) dispersing support particles in an aqueous solution including an acid and performing acid treatment, washing, filtration and heat treatment; or ii) placing support particles in a reactor and adding ozone ($O_3$) thereto.

In the catalyst complex may be manufacture by steps including: reacting the support particles with a metal catalyst precursor. Preferably, the metal catalyst particles may be attached to the surface of the support particles.

Preferably, the metal catalyst particles may be attached in a fluidized-bed reactor. In the fluidized-bed reactor, a pressure may suitably be of about 0.1 to 5 torr and a temperature may be of about 150 to 200° C.

Preferably, a purging gas and a reactive gas may be introduced into the fluidized-bed reactor. The purging gas may suitably be introduced at a flow rate of about 50 to 200 sccm and the reactive gas may be introduced at a flow rate of about 10 to 200 sccm.

The catalyst complex may include an amount of about 5 to 20 wt % of the metal catalyst particles based on the total weight of the catalyst complex.

The catalyst complex may be manufactured by step including: providing support particles containing a functional group in a fluidized-bed reactor, supplying a metal catalyst precursor into the fluidized-bed reactor to thus bring the support particles into contact with the metal catalyst precursor, introducing a purging gas into the fluidized-bed reactor, introducing a reactive gas into the fluidized-bed reactor, and re-introducing a purging gas into the fluidized-bed reactor. A cycle including the step of the introducing the reactive gas and the step of the re-introducing the purging gas may be repeated once or more.

In an aspect, provided is a method of manufacturing an electrolyte membrane for a fuel cell. The method may include: applying a catalyst composition including the catalyst complex described herein and an ionomer solution on a release sheet, providing a porous reinforcement layer on the applied catalyst composition, impregnating the pores in the porous reinforcement layer with the catalyst composition, and heat-treating the catalyst composition.

The impregnating may include impregnating a lower portion of the porous reinforcement layer with the catalyst composition applied on the release sheet and impregnating an upper portion of the porous reinforcement layer with the catalyst composition by applying the catalyst composition on the impregnated porous reinforcement layer.

Further provided is an electrolyte membrane for a fuel cell including the catalyst composition including the catalyst complex as described herein.

The electrolyte membrane may include an amount of about 0.05 to 3 wt % of the catalyst complex based on the total weight of the electrolyte membrane.

Also provided is a fuel cell including the catalyst complex as described herein.

In another aspect, provided is a vehicle including the fuel cell as described herein.

Other aspects of the invention are disclosed info.

According to various exemplary embodiments of the present invention, provided is a method of manufacturing a catalyst composition, in which metal catalyst particles may be uniformly deposited on a support through atomic layer deposition using a fluidized-bed reactor, thereby reducing manufacturing costs due to the use of a small amount of metal catalyst particles.

According to various exemplary embodiments of the present invention, an electrolyte membrane that may have improved durability due to the use of a small amount of metal catalyst particles may be provided.

According to various exemplary embodiments of the present invention, an electrolyte membrane, in which the generation of hydrogen peroxide or radicals may be suppressed, may be provided thus increasing the durability of the electrolyte membrane and OCV.

According to various exemplary embodiments of the present invention, provided is a method of manufacturing an electrolyte membrane for a fuel cell, in which the catalyst complex may be dispersed throughout the ionomer solution, thereby improving the durability of the electrolyte membrane.

The effects of the present invention are not limited to the foregoing, and should be understood to include all effects that can be reasonably anticipated from the following description.

DETAILED DESCRIPTION

Figure 1:
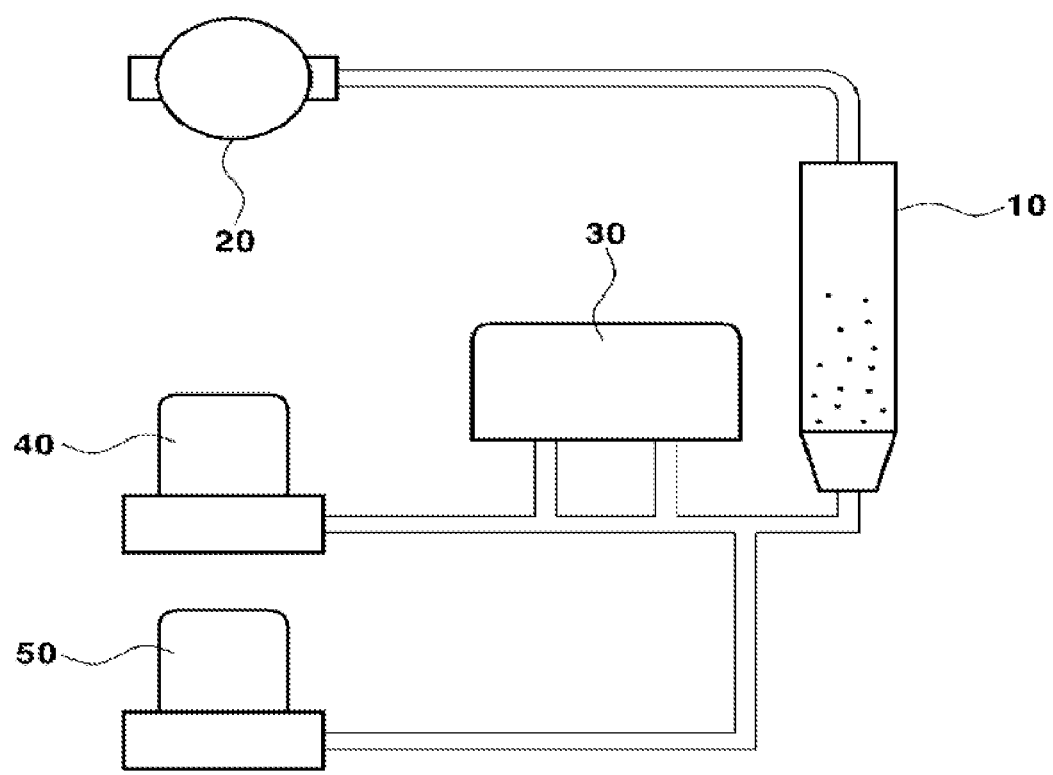
FIG. 1 shows an exemplary apparatus for use in an exemplary process of manufacturing an exemplary catalyst complex according to an exemplary embodiment of the present invention.

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include any subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a detailed description will be given of various exemplary embodiments of the present invention.

The present invention pertains to a catalyst complex for a fuel cell, a method of manufacturing the catalyst complex for a fuel cell, an electrolyte membrane for a fuel cell including the catalyst complex, and a method of manufacturing the electrolyte membrane for a fuel cell including the catalyst complex. The catalyst complex and the electrolyte membrane according to exemplary embodiments of the present invention are described together with the method of manufacturing the catalyst complex and the method of manufacturing the electrolyte membrane.

In an aspect, provided is a method of manufacturing the catalyst complex, which may include preparing support particles containing a functional group and manufacturing a catalyst complex by attaching metal catalyst particles to the support particles containing the functional group.

The steps thereof are specified below. Here, the expression "attaching" or "attached" may be used interchangeably with the expression "depositing" or "deposited" in a typical chemical process, and that the expression "attaching" or "attached" is used for the sake of understanding is hereby made known in advance.

Support Preparation Step

According to an exemplary embodiments, the support particles containing a functional group on the surface thereof may be suitably prepared in two manners. For example, the support particles containing the functional group may be prepared i) by dispersing support particles in an aqueous solution including an acid and performing acid treatment, washing, filtration and heat treatment or ii) by placing support particles in a reactor and adding ozone ($O_3$) thereto.

This step is a process of performing pretreatment on the surface of the support, whereby the metal catalyst particles may be attached to the surface of the support particles.

In the first manner, support particles that have not been subjected to any treatment are prepared, dispersed in an aqueous solution including an acid, and subjected to acid treatment. Here, the acid may include, but not be particularly limited, one or more selected from the group consisting of citric acid, nitric acid, and sulfuric acid. Moreover, an ultrasonic disperser may be used as necessary so that the support particles may be more thoroughly dispersed in the aqueous solution including the acid, and for example, a mixture may be obtained by performing dispersion using an ultrasonic disperser for about 1 hr.

The mixture may be filtered to extract a slurry, and the slurry may be sufficiently washed with distilled water to afford a filtrate. Thereafter, the filtrate may be sufficiently heat-treated at a temperature of about 100 to 150° C. for about 30 to 90 min to thus obtain support particles containing a functional group. Particularly, the heat treatment may be performed at a temperature of about 110 to 120° C. for about 50 to 60 min. Here, when the temperature and time for the heat treatment do not fall in the above ranges, the functional group may not be properly formed on the surface of the support.

In the second manner, support particles may be placed in a reactor and then ozone ($O_3$) may be added thereto, thus manufacturing support particles containing a functional group. The ozone may be introduced at a flow rate of about 80 to 120 sccm for about 1 to 5 min at a temperature of about 150 to 200° C. Preferably, the ozone may be introduced at a flow rate of about 90 to 110 sccm for about 2 to 4 min at an internal temperature of the reactor of about 170 to 190° C., and particularly, at a flow rate of about 95 to 100 sccm for about 2 to 3 min at an internal temperature of the reactor of about 175 to 180° C.

The reactor may particularly be a fluidized-bed reactor.

The functional group contained in the pretreated support particles may suitably include a hydroxyl (—OH) functional group. The hydroxyl functional group formed on the support may react with a metal catalyst precursor in a subsequent process, and thus, in order to manufacture the catalyst complex of the present invention, the formation of the hydroxyl functional group on the surface of the support particles may be important in the present invention.

In the present invention, the support particles may include an ionomer, rather than carbon. Particularly, the support particles may include one or more selected from the group consisting of a fluorine-based polymer, a benzimidazole-based polymer, a polyimide-based polymer, a polyetherimide-based polymer, a polyphenylene-sulfide-based polymer, a polyether-ether-ketone-based polymer, and a polyphenylquinoxaline-based polymer.

When ionomer particles, rather than carbon particles, may be selected as the support particles of the present invention, the dispersibility of the support particles in the ionomer solution may be improved and high conductivity may be realized even using a small amount of metal catalyst particles.

Catalyst-Complex-Manufacturing Step

Metal catalyst particles may be attached to the support particles containing the functional group prepared above, thus manufacturing a catalyst complex, and particularly, the support particles containing the functional group may be reacted with a metal catalyst precursor so that the metal catalyst particles may be formed on the surface of the support particles.

In the present invention, rather than physically attaching the catalyst particles to the surface of the support particles through simple mixing, the metal catalyst precursor may be reacted with the functional group formed on the surface of the support particles so that metal catalyst particles may be formed on the surface of the support particles. Preferably, the metal catalyst particles may not be formed on the surface of the support particles unless the surface of the support particles is modified with a specific functional group.

In the present invention, since the metal catalyst particles are described as being attached to the surface of the support particles for simplicity of expression and for the sake of understanding, there should be no misunderstanding of the expression.

The manufacture of the catalyst complex of the present invention may be performed in a fluidized-bed reactor, and the deposition of the metal catalyst particles may be carried out using atomic layer deposition. When the metal catalyst particles are attached to the surface of the support particles using the atomic layer deposition process, the metal catalyst may be deposited on an atomic scale, and thus there may be no impurity content and precise control may be possible.

FIG. 1 schematically shows an exemplary apparatus for manufacturing an exemplary catalyst complex, in which an exemplary manufacturing process of an exemplary catalyst complex according to an exemplary embodiment of the present invention may be performed. With reference thereto, the apparatus for manufacturing a catalyst complex may include a fluidized-bed reactor 10, a rotary pump 20 (or vacuum pump) for controlling the internal pressure of the fluidized-bed reactor 10, a container 30 holding a metal catalyst precursor for introducing the metal catalyst precursor into the fluidized-bed reactor 10, a purging gas tank 40 for introducing a purging gas into the fluidized-bed reactor 10, and a reactive gas tank 50 for introducing a reactive gas into the fluidized-bed reactor 10. Each tank may include a mass flow controller (MFC) to control a flow rate. The fluidized-bed reactor 10 may serve as a chamber for an atomic layer deposition process, and thus may be initially evacuated with the rotary pump 20, and the vacuum level of the operation pressure may be maintained constant even during processing.

The catalyst-complex-manufacturing step according to an exemplary embodiment of the present invention may include a preparation step of providing support particles containing a functional group in a fluidized-bed reactor, a contact step of supplying a metal catalyst precursor into the fluidized-bed reactor to thus bring the support particles containing the functional group into contact with the metal catalyst precursor, a first purging step of introducing a purging gas into the fluidized-bed reactor, a reaction step of introducing a reactive gas into the fluidized-bed reactor, and a second purging step of re-introducing a purging gas into the fluidized-bed reactor.

A cycle including the reaction step and the second purging step may be repeated once or more. Preferably, the cycle may be repeated 5 to 20 times, or particularly 10 to 15 times. As the number of cycles increases, the number and size of metal catalyst particles attached to the surface of the support particles containing the functional group may increase. When the number of cycles is less than 5, the metal catalyst particles may not grow to an extent that catalytic activity appears. On the other hand, when the number of cycles is greater than 20 times, the metal catalyst particles may be excessively attached to the surface of the support particles containing the functional group.

Preparation Step

Preferably, the support particles containing the functional group may be placed in a fluidized-bed reactor in the preparation step. Here, the internal pressure of the fluidized-bed reactor may be about 0.1 to 0.5 torr. This condition, e.g., the internal pressure may create an atmosphere with only small content of other gases, or impurities, when the metal catalyst precursor reacts on the surface of the support particles containing the functional group to form metal catalyst particles.

Contact Step

In the contact step, a metal catalyst precursor may be supplied into the fluidized-bed reactor including the support particles containing the functional group. Preferably, the supplied metal catalyst precursor may contact with and reacts with the functional group contained in the support particles suspended in the fluidized-bed reactor, and may be thus provided on the surface of the support particles. Here, the metal catalyst precursor may be supplied all at once for about 90 to 150 sec. Also, the temperature of the container in which the metal catalyst precursor is contained may be maintained at a temperature of about 20 to 40° C.

The supplied metal catalyst precursor may be one or more selected from the group consisting of $MeCpPtMe_3$, $PtCl_4$, $K_2PtCl_4$, $PtCl_2$, $PtBr_2$, and $PtO_2$.

Purging Step

The purging step of the present invention may include a first purging step immediately before the introduction of a reactive gas and a second purging step immediately after the introduction of the reactive gas.

In the purging step, the purging gas may be introduced into the fluidized-bed reactor, and in the present invention, the purging gas may include argon (Ar). Here, the introduced purging gas may remove residual radicals that do not participate in the reaction.

Here, the purging gas may be supplied at a flow rate of about 50 to 200 sccm for about 60 to 120 sec.

Reaction Step

In the reaction step, the reactive gas supplied into the fluidized-bed reactor may include oxygen ($O_2$), ozone ($O_3$) or combinations thereof. The supplied reactive gas may accelerate the substitution of the metal catalyst precursor provided on the surface of the support particles containing the functional group into metal catalyst particles. Here, the reactive gas may suitably be supplied at a flow rate of about 10 to 200 sccm for about 60 to 120 sec. Here, the substituted metal catalyst particles have a size of about 1 to nm, and preferably of about 3 to 5 nm.

Also, in the reaction step, the internal operation pressure of the fluidized-bed reactor may suitably be about 1 to 5 torr, and the internal reaction temperature of the fluidized-bed reactor may be of about 150 to 200° C. When the reaction temperature is less than about 150° C., the metal catalyst particles may not be deposited properly on the surface of the support particles. On the other hand, when the reaction temperature is greater than about 200° C., the support particles may melt, which is undesirable.

Figure 2:
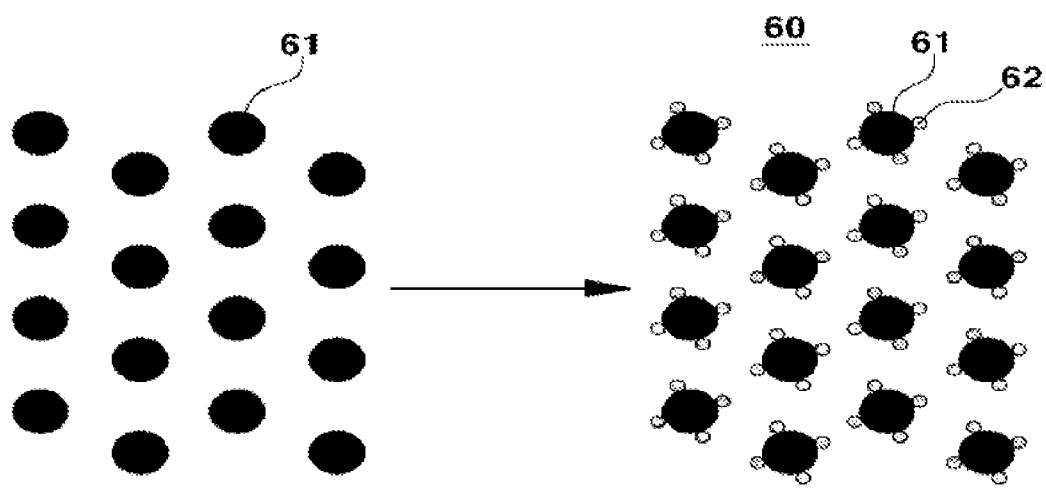
FIG. 2 shows an exemplary process of manufacturing an exemplary catalyst complex according to an exemplary embodiment of the present invention.

FIG. 2 schematically shows the process of manufacturing the catalyst complex 60 according to an exemplary embodiment of the present invention. With reference thereto, the support particles 61 may be pretreated, and thus the support particles 61 containing the functional group may be obtained in a powder phase, after which metal catalyst particles 62 may be attached to the surface of the support particles 61 containing the functional group through atomic layer deposition, thereby manufacturing a catalyst complex 60.

Preferably, the catalyst complex thus manufactured may include an amount of about 5 to 20 wt % of the metal catalyst particles based on the total weight of the catalyst complex.

Method of Manufacturing Electrolyte Membrane for Fuel Cell

The electrolyte membrane for a fuel cell according to an exemplary embodiment of the present invention may be manufactured using a catalyst composition including the catalyst complex manufactured above and an ionomer solution.

The method of manufacturing the electrolyte membrane according to an exemplary embodiment of the present invention may include applying the catalyst composition on a release sheet, providing a porous reinforcement layer on the applied catalyst composition, impregnating the pores in the porous reinforcement layer with the catalyst composition, and heat-treating the catalyst composition.

Figure 3:
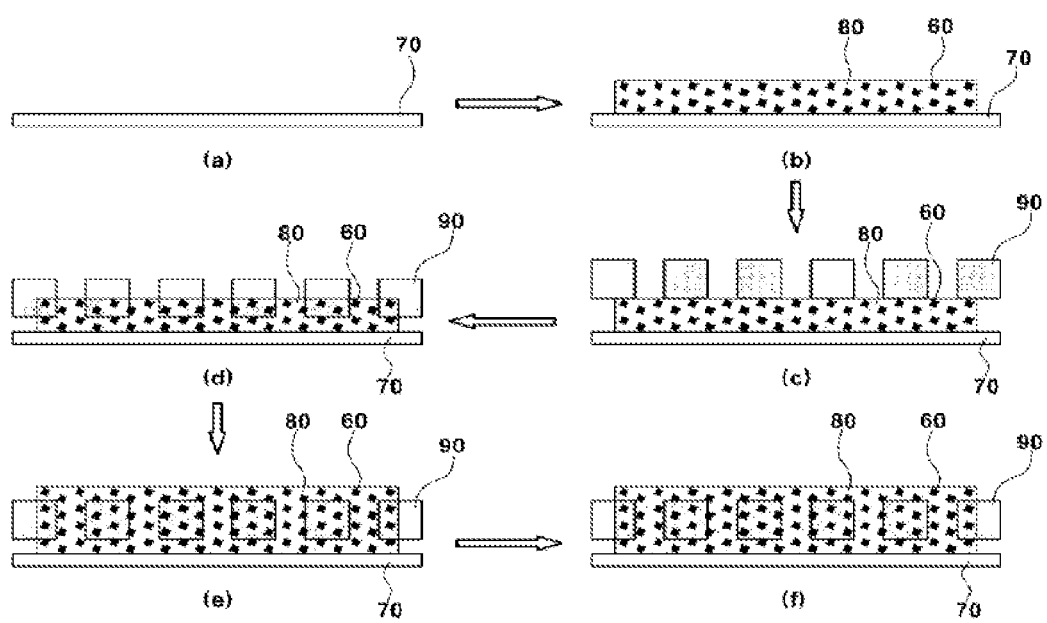
FIG. 3 shows an exemplary process of manufacturing an exemplary electrolyte membrane for a fuel cell according to an exemplary embodiment of the present invention.

FIG. 3 schematically shows an exemplary process of manufacturing an exemplary electrolyte membrane 100 for a fuel cell according to an exemplary embodiment of the present invention. With reference thereto, the steps thereof are described below.

A release sheet 70 may be prepared (a), after which the catalyst composition may be applied on the release sheet 70 (b). Here, the catalyst composition may include the catalyst complex 60 and the ionomer solution 80.

The ionomer solution 80 may be a mixed solution obtained by dispersing an ionomer in one or more solvents including an alcohol, water and combinations thereof. The term "solution" (such as ionomer solution) as used herein is inclusive of dispersions and other fluid admixtures that may or may not be true solutions.

The ionomer contained in the ionomer solution 80 may include a variety of groups and polymers including for example one or more selected from the group consisting of a fluorine-based polymer, a benzimidazole-based polymer, a polyimide-based polymer, a polyetherimide-based polymer, a polyphenylene-sulfide-based polymer, a polyether-etherketone-based polymer, and a polyphenyl-quinoxaline-based polymer. As would be understood, ionomers include polymers that have ionized or ionizable units (such as a sulfonic acid group, including perfluorinated sulfonic groups, e.g. Nafion). In certain aspects, an ionomer can have certain physical properties including electrical conductivity and/or isoviscosity.

The catalyst complex 60 particularly may include metal catalyst particles and support particles, and according to an exemplary embodiment of the present invention, the ionomer included in the support particles and the ionomer included in the ionomer solution 80 may be the same as each other.

The catalyst composition may suitably include an amount of about 5 to 20 wt % of the ionomer contained in the ionomer solution 80 based on the total weight of the catalyst composition.

A porous reinforcement layer 90 may be provided on the catalyst composition applied on the release sheet 70 (c). For example, the porous reinforcement layer 90 may suitably include a porous expanded polytetrafluoroethylene (e-PTFE) film.

Impregnating the pores in the porous reinforcement layer 90 with the catalyst composition (d, e) may include: a first impregnation step of impregnating a lower portion of the porous reinforcement layer 90 with the catalyst composition applied on the release sheet 70 (d) and a second impregnation step of impregnating an upper portion of the porous reinforcement layer 90 with the catalyst composition by applying the catalyst composition on the impregnated porous reinforcement layer 90 (e). If necessary, the catalyst composition impregnated after the first impregnation step or the second impregnation step may be dried. For example, the drying may be performed at a temperature of about 60 to 100° C. for about 30 min to 1 hr. When the drying temperature is less than about 60° C., the solvent of the ionomer solution 80 may not sufficiently evaporate, thus increasing the thickness of the electrolyte membrane 100 and deteriorating the performance thereof. On the other hand, when the drying temperature is greater than about 100° C., the solid in the ionomer solution 80 may not be uniformly dispersed in the electrolyte membrane 100. Preferably, the drying may be performed at a temperature of about 75 to 90° C. for about 40 min to 1 hr.

The heat treatment (f) may be performed at a temperature of about 150 to 200° C. for about 5 to 10 min as the final step in the method of manufacturing the electrolyte membrane 100. When the heat treatment temperature is less than about 150° C., the electrolyte membrane 100 may not be heat-treated properly, thus increasing the thickness of the electrolyte membrane 100 and deteriorating the performance thereof. On the other hand, when the heat treatment temperature is greater than about 200° C., the ionomer in the electrolyte membrane 100 may agglomerate or be deformed, thus deteriorating ionic conductivity. Preferably, the heat treatment may be performed at a temperature of about 170 to 190° C. for about 8 to 10 min.

Thereby, the electrolyte membrane 100 of the present invention including the skeleton of the porous reinforcement layer 90 and the catalyst complex 60 and the ionomer excluding the solvent may be manufactured.

Electrolyte Membrane for Fuel Cell

The electrolyte membrane for a fuel cell according to an exemplary embodiment of the present invention may include the catalyst complex of the present invention.

For example, the electrolyte membrane according to an exemplary embodiment of the present invention may include a porous reinforcement layer and the catalyst complex and the ionomer with which the porous reinforcement layer may be impregnated.

The electrolyte membrane may suitably include an amount of about 0.05 to 3 wt % of the catalyst complex and an amount of about 97 to 99.05 wt % of the ionomer based on the total weight of the electrolyte membrane. When the amount of the catalyst complex is less than about 0.05 wt %, hydrogen passed through the electrolyte membrane and oxygen may not be effectively converted into water through catalytic reaction. On the other hand, when the amount of the catalyst complex is greater than about 3 wt %, an increase in the use of the metal catalyst may lead to high manufacturing costs and may deteriorate the electrical insulating properties of the electrolyte membrane.

The catalyst complex may include the metal catalyst particles and the support particles to which the metal catalyst particles are attached, and the support particles may include the ionomer. The metal catalyst particles may suitably have a size of about 1 to 10 nm, and preferably of about 3 to 5 nm.

Here, the ionomer included in the support particles and the ionomer not included in the catalyst complex may be the same as each other.

Although the various exemplary embodiments of the present invention have been disclosed for illustrative purposes, those skilled in the art will appreciate that various modifications are possible without departing from the scope and spirit of the invention as disclosed in the accompanying claims, and such modifications should not be understood separately from the technical ideas or essential characteristics of the present invention.

What is claimed is:

1. A method of manufacturing a catalyst complex for a fuel cell, comprising:
   preparing support particles containing a functional group; and manufacturing a catalyst complex by attaching metal catalyst particles to the support particles, wherein the support particles comprise an ionomer, and wherein the support particles are prepared by steps comprising:

dispersing the support particles in an aqueous solution comprising an acid and performing acid treatment, washing, filtration and heat treatment; or placing the support particles in a reactor and adding ozone ($O_3$) thereto.

2. The method of claim 1, wherein the support particles comprise a hydroxyl functional group.

3. The method of claim 1, wherein the catalyst complex is manufactured by steps comprising:

reacting the support particles with a metal catalyst precursor.

4. The method of claim 1, wherein the metal catalyst particles are attached to the support particles in a fluidized-bed reactor.

5. The method of claim 4, wherein in the fluidized-bed reactor, a pressure is of about 0.1 to 5 torr and a temperature is of about 150 to 200° C.

6. The method of claim 4, wherein a purging gas and a reactive gas are introduced into the fluidized-bed reactor.

7. The method of claim 6, wherein the purging gas is introduced at a flow rate of about 50 to 200 sccm and the reactive gas is introduced at a flow rate of about 10 to 200 sccm.

8. The method of claim 1, wherein the catalyst complex comprises an amount of about 5 to 20 wt % of the metal catalyst particles, based on the total weight of the catalyst complex.

9. The method of claim 1, wherein the catalyst complex is manufactured by steps comprising:

providing the support particles in a fluidized-bed reactor;

supplying a metal catalyst precursor into the fluidized-bed reactor to thus bring the support particles into contact with the metal catalyst precursor;

introducing a purging gas into the fluidized-bed reactor;

introducing a reactive gas into the fluidized-bed reactor; and re-introducing a purging gas into the fluidized-bed reactor, wherein a cycle comprising the step of the introducing the reactive gas and the step of the re-introducing the purging gas is repeated once or more.

\* \* \* \* \*